United States Patent [19]

Izuchi et al.

[11] Patent Number: 4,585,186
[45] Date of Patent: Apr. 29, 1986

[54] WEBBING RETRACTOR

[75] Inventors: Shingo Izuchi; Toshimasa Yamamoto; Shinji Mori, all of Niwa, Japan

[73] Assignee: Kabushiki Kaisha Toka-rika-denki-seisakusho, Aichi, Japan

[21] Appl. No.: 654,311

[22] Filed: Sep. 25, 1984

[30] Foreign Application Priority Data

Sep. 26, 1983 [JP] Japan .......................... 58-148314[U]

[51] Int. Cl.[4] ...................... B65H 75/48; B60R 22/34
[52] U.S. Cl. ............................................ 242/107.4 D
[58] Field of Search ................. 242/107.4 D, 107.4 A; 280/803, 807; 297/476

[56] References Cited

U.S. PATENT DOCUMENTS

| 3,348,789 | 10/1967 | Hirsch | 242/107.4 D |
| 3,635,420 | 1/1972 | Romanzi, Jr. | 242/107.4 D |
| 3,873,041 | 3/1975 | Rumpf et al. | 242/107.4 D X |
| 4,171,782 | 10/1979 | Rumpf | 242/107.4 D |

Primary Examiner—John M. Jillions
Attorney, Agent, or Firm—Sixbey, Friedman & Leedom

[57] ABSTRACT

In a webbing retractor, a spring member is caused to abut on a webbing takeup shaft to be rotated together therewith by a frictional force between the takeup shaft and the spring member within a range defined by rotation restricting means, locking means for preventing a webbing unwinding rotation of the takeup shaft is put in a released situation when the spring member is rotated in a direction of a webbing unwinding, and the locking means is put a locking situation when the spring member is rotated in a direction of a webbing winding. Accordingly, an occupant can be put in a surely restrained situation by the webbing when the webbing is wound on the takeup shaft in a slight amount after the webbing is worn on the occupant, though the webbing retractor has a simple construction.

9 Claims, 6 Drawing Figures

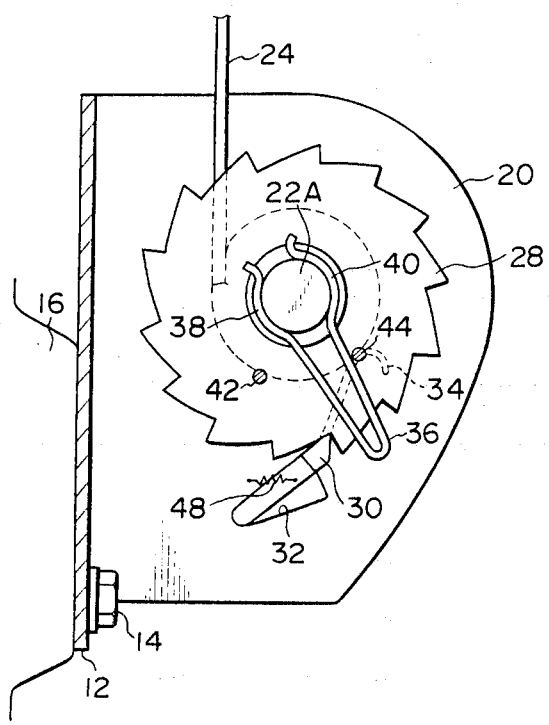

WEBBING RETRACTOR

BACKGROUND OF THE INVENTION

1. Field of the Invention

The present invention relates to a webbing retractor retracting an occupant restraining webbing therein, adapted for use in a seatbelt system for a vehicle.

2. Description of the Prior Art

In the seatbelt system, the webbing is retracted from one end portion thereof in the webbing retractor and stored therein.

The webbing retractor is provided with a locking mechanism in order to put the occupant in a securely restrained situation by the webbing.

In such locking mechanism it is common that the webbing is automatically locked to prevent it from being unwound after the occupant dons the webbing.

For example, the automatic locking mechanism proposed in U.S. Pat. No. 3,635,420 (Inventor: Romanzi, Jr.) is such constructed that a restraint of the occupant by the webbing and a release thereof from the webbing are detected in accordance with a rotation of a webbing takeup shaft and a pawl engaged with a ratchet wheel fixed to the takeup shaft is controlled by a control plate to be engaged with the ratchet wheel so that the webbing is automatically prevented from being unwound after the occupant wears the webbing.

In such conventional webbing retractors, however, means for detecting rotation of the takeup shaft to control a motion of the pawl is made complicated or such means requires many parts therefor, which results in increase of manufacturing costs.

SUMMARY OF THE INVENTION

In view of the above facts, the present invention has as its object the provision of a webbing retractor having a simple structure and capable of being produced with a reduced manufacturing cost, in which an occupant can be put in a securely restrained situation by an occupant restraining webbing after the occupant dons or wears the webbing.

In the webbing retractor according to the present invention, a rotation of the takeup shaft is transmitted to a spring member forced to contact with the takeup shaft by a self spring force of the spring member, and the spring member is made rotatable together with the takeup shaft within a predetermined range by rotation restricting means, the spring member being subjected to a rotation in a direction of a webbing unwinding during an operation of an occupant wearing the webbing so that locking means is put in a released situation where the takeup shaft is rotatable and, thereafter, the spring member being subjected to a rotation in a direction of a webbing winding by resilient means so that the locking means is put in a locked situation where the takeup shaft is prevented from a rotation in the direction of the webbing unwinding.

Accordingly, the occupant can surely be put in the restrained situation when the webbing is worn about the occupant.

Description will hereinunder be given of embodiments according to the present invention with reference to the drawings attached hereto.

BRIEF DESCRIPTION OF THE DRAWINGS

FIG. 3 is an operational view of FIG. 2;

PREFERRED EMBODIMENTS OF THE INVENTION

Figure 1:
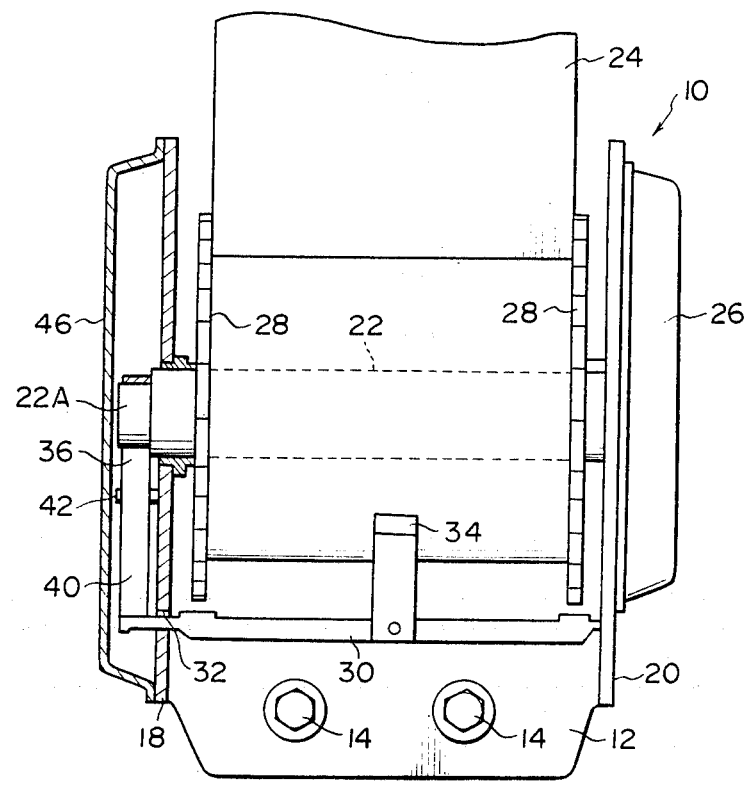
FIG. 1 is a partially and vertically sectional view of a webbing retractor of a first embodiment according to the present invention.
Figure 2:
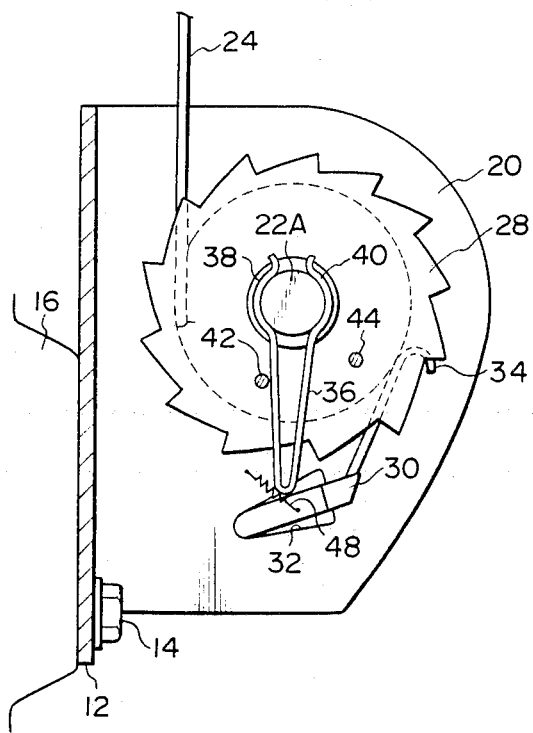
FIG. 2 is a left side view of FIG. 1 in which a part of a leg plate and a cover are removed.

In FIGS. 1 and 2 there is shown a webbing retractor 10 to which the present invention is applied.

The webbing retractor 10 is fixed at its base 12 to a vehicle body 16 through mounting bolts 14. Elongated from both side portions of the base 12 are a pair of leg plates 18 and 20 parallel to each other, which rotatably supports portions of an webbing takeup shaft 22 adjacent to both its ends.

The takeup shaft 22 is secured at its intermediate portion with one end portion of an occupant restraining webbing 24. One end portion of the takeup shaft 22 is elongated through the leg plate 20 and the takeup shaft 22 is rotationally biased in a direction of a webbing winding, or a webbing retraction, by a spiral spring retracting unit 26, as is biasing means, disposed between the one end portion and the leg plate 20.

The takeup shaft 22 is fixed with a pair of ratchet wheels 28 on both sides of the webbing 24, so that the ratchet wheels 28 are rotated together with the takeup shaft 22. Opposed to the ratchet wheels 28 is a pawl 30 supported rotatably by the leg plates 18 and 20. The pawl 30 is received at both its end portions in supporting holes 32 formed on the leg plates 18 and 20, and it stops a webbing unwinding rotation of the takeup shaft 22 when the pawl 30 is engaged with the ratchet wheels 28.

Also, the pawl 30 is fixed at its intermediate portion with a diameter sensing arm 34 which is a diameter sensing means, a curved forward end portion of which is caused to abut on an outer peripheral face of a roll of the webbing 24 which has been retracted on the takeup shaft 22. An outer diameter of the roll of webbing 24 is increased in accordance with a winding of the webbing 24 on the takeup shaft 22, and when the webbing 24 is wound on the takeup shaft 22 in a predetermined amount or more, the diameter sensing arm 34 puts the pawl 30 in a released situation from the ratchet wheels 28.

On the other hand, the outer diameter of the roll of the webbing 24 is decreased in accordance with an unwinding of the webbing 24, and, when the webbing 24 is unwound from the webbing retractor 10 and the occupant wears the webbing 24, the diameter sensing arm 34 puts the pawl 30 in an engageable situation with the ratchet wheels 28.

An end portion 22A of the takeup shaft 22 elongated through the leg plate 18 is clipped by a spring member 36, as shown in FIG. 2. The spring member 36 is formed in forked shape with a pair of legs 38 and 40, end portions of which are curved along an outer periphery of the end portion 22A of the takeup shaft 22. The end portion 22A is clipped by the end portions of the legs 38 and 40 owing to a self spring force of the spring member 36. A projected end portion of the spring member 36, i.e., a connecting portion of the legs 38 and 40, abuts on the pawl 30.

The spring member 36 has a spring property in such directions that the leg 38 and 40 approach to each other and, therefore, when the takeup shaft 22 is rotated the spring member 36 is also rotated together with the takeup shaft 22 due to a frictional force occurring therebetween. However, disposed adjacent to both sides of the spring member 36 are a pair of pins 42 and 44, as shown in FIG. 2, whereby the rotation of the spring member 36 is restricted within a range between the pins 42 and 44, and even if the takeup shaft 22 is further rotated the spring member 36 slips relative to the takeup shaft 22. Thus, the pins 42 and 44 constitute rotation restricting means for restricting a rotation of the spring member 36.

Figure 2A:
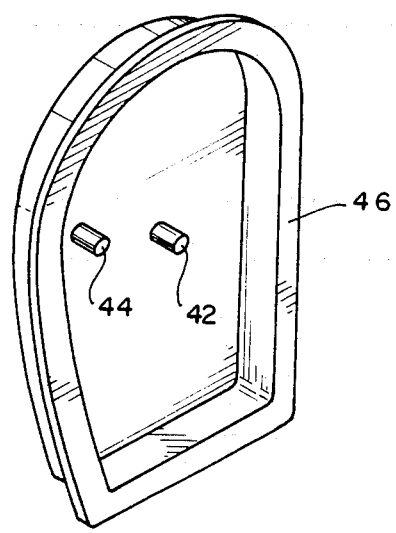
FIG. 2A is a perspective view of the cover member which was removed for purposes of showing the FIG. 2 depiction.

In this embodiment, the respective pins 42 and 44 are provided on the leg plate 18, but they can be provided on an inside surface of a cover 46 fixed to the leg plate 18 for concealing the spring member 36 as shown in FIG. 2A.

On the other hand, the pawl 30 is connected to a coil spring 48, as shown in FIG. 2, whereby the pawl 30 and the diameter sensing arm 34 are biased in a counterclockwise direction in FIG. 2, namely, in such a direction that the pawl 30 is engaged with the ratchet wheels 28. Thus, the pawl 30, the ratchet wheels 28 and the coil spring 48 constitute locking means. In FIG. 2, the pawl 30 is prevented from a rotation in the counterclockwise direction by the diameter sensing arm 34 and the spring member 36.

In addition, the spring member 36 is rotated until it is caused to abut on the pin 42, when the takeup shaft 22 is rotated in a direction of a webbing unwinding, as shown in FIG. 2. The situation that the spring member 36 abuts on the pin 42 is defined as a first position of the spring member 36, in which the pawl 30 is released from the ratchet wheels 28. From this situation the spring member 36 is rotated in a direction of a webbing winding and, then, the spring member 36 is caused to abut on the pin 44, as shown in FIG. 3. The situation that the spring member 36 abuts on the pin 44 is defined as a second position of the spring member 36, in which the pawl 30 is put in an engageable situation with the ratchet wheels 28.

Description will now be given of operation of the first embodiment thus constructed.

The webbing retractor 10 is locked automatically as follows:

FIGS. 1 and 2 show a full retracted state of the webbing 24 on the takeup shaft 22. The webbing 24 is unwound from an one end portion (not shown) thereof by the occupant in order to wear the webbing 24 and a tongue plate secured to the one end portion is latched to a buckle device. Thus, the occupant can be restrained with an intermediate portion of the webbing 24.

In the full retracted state of the webbing 24 the pawl 30 is pushed down by the diameter sensing arm 34 and it is prevented from rotation in the counterclockwise direction by the projected portion of the spring member 36. Accordingly, even if the webbing 24 is unwound by the occupant so that the diameter of the roll of the webbing which has wound on the takeup shaft 22 is reduced, the pawl 30 is maintained in a released situation from the ratchet wheels 28.

Next, after the occupant wears the webbing 24, the webbing 24 is wound on the takeup shaft 22 in a slight amount by the spiral spring retracting unit 26 due to a change of attitude or a breathing of the occupant before the occupant takes a driving situation or just thereafter. In accordance with the rotation of the takeup shaft 22 in the direction of the webbing winding the spring member 36 is also rotated in the counterclockwise direction on FIG. 2 to be moved to a situation shown in FIG. 3, whereby the pawl 30 is released from the abutting situation on the spring member 36. As a result, the pawl 30 is engaged with the ratchet wheels 28 by a biasing force of the coil spring 48, as shown in FIG. 3, so that the takeup shaft 22 is prevented from the rotation in the direction of the webbing unwinding.

In this connection, the teeth of each of the ratchet wheels 28 are formed in serration and, therefore, the webbing 24 can be wound on the takeup shaft 22, namely, the takeup shaft 22 can be rotated in the direction of the webbing winding. In consequence, when the occupant or a baggage is fastened by the webbing 24, he or it is automatically put in a securely restrained situation by the webbing 24.

A release of the webbing retractor 10 from the stop of the webbing unwinding, i.e., a release of the pawl 30 from the engaged situation with the ratchet wheels 28, is carried out by releasing the tongue plate from the latched situation to the buckle device to cause the spiral spring retracting unit 26 to wind the webbing 24 on the takeup shaft 22 up to the full wound state. That is to say, when the tongue plate is released from the latched situation, the webbing 24 is automatically wound on takeup shaft 22 by the spiral spring retracting unit 26. Therefore, the diameter sensing arm 34 is rotated in a clockwise direction on FIG. 3 in accordance with an increase of the diameter of a roll of the webbing 24 retracted on the takeup shaft 22 and the pawl 30 is also released from the engaged situation with the ratchet wheels 28. Thereafter, when the webbing 24 is unwound in a slight amount for next use of the seatbelt system, the spring member 36 is returned back to the initial situation shown in FIG. 2.

Figure 4:
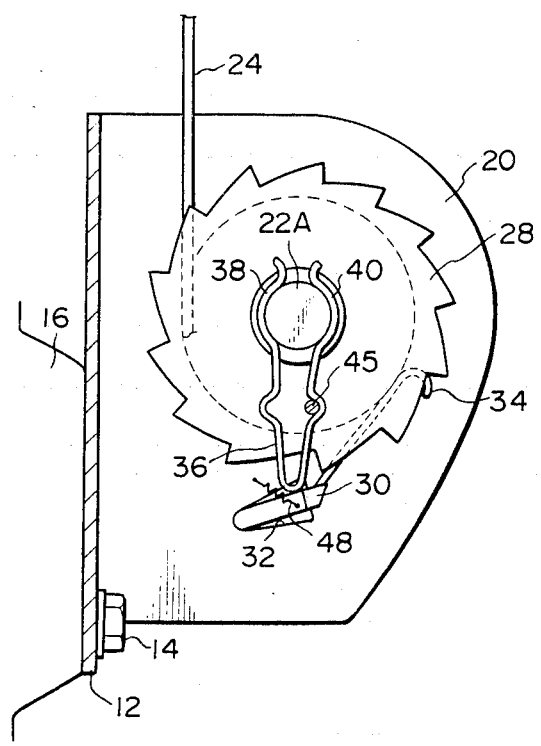
FIG. 4 is a second embodiment according to the present invention.

In FIG. 4, there is shown a second embodiment in which a pin 45 opposed to the spring member 36 is disposed between the legs 38 and 40. The pin 45 can be provided on either the leg plate 18 or the cover 46 as well as the above first embodiment. Also, the respective legs 38 and 40 of the spring member 36 are further formed with small curved portions fitting the pin 45. In the situation that one of the legs 38 and 40 of the spring member 36 is abutting on the pin 45, when the takeup shaft 22 is further rotated in such a direction that the one of the legs 38 and 40 abuts on the pin 45, the spring member 36 clipping the end portion 22A of the takeup shaft 22 is subjected to a force in such a direction that a distance between the legs 38 and 40 is increased, so that the frictional force occurring between the end portion 22A of the takeup shaft 22 and the spring member 36 is reduced. As a result, a winding or unwinding of the webbing 24 can smoothly be conducted even in such a situation that one of the legs 38 and 40 is abutting on the pin 45. In the other functions and effects the second embodiment is the substantially same as the first embodiment.

Figure 5:
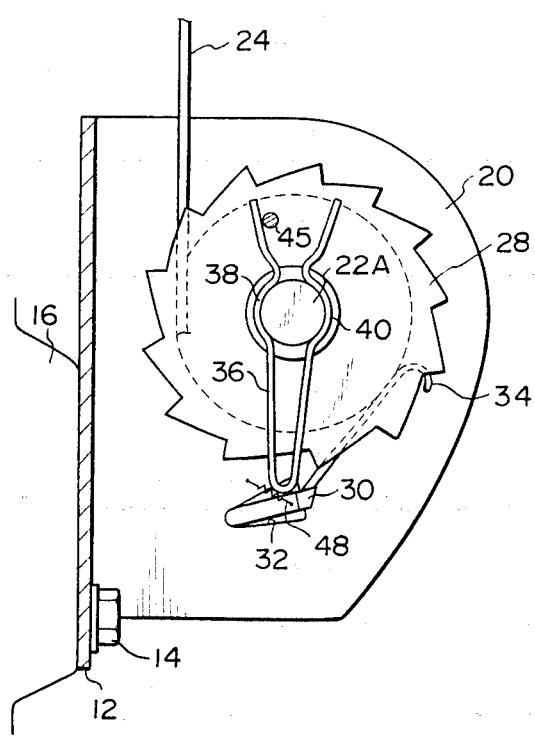
FIG. 5 is a third embodiment according to the present invention.

In FIG. 5, there is shown a third embodiment in which the respective legs 38 and 40 of the spring member 36 are elongated over the end portion 22A of the takeup shaft 22 and the pin 45 which is one of the rotation restricting means is disposed between the elongated portions of the leg 38 and 40. In this embodiment, when the takeup shaft is further rotated from such a situation that one of the legs 38 and 40 is abutting on the pin 45, the spring member 36 is forced in a direction that a distance between the legs 38 and 40 is increased, so that a frictional force between the end portion 22A and the spring member 36 is reduced, as well as the second embodiment.

In all the above embodiments, the pawl 30 is disposed under the ratchet wheels 28, but it can be disposed above the ratchet wheels 28 so as to be engaged with the ratchet wheel 28 by the self-weight of the pawl 30.

Various changes can be made to the forms of the invention herein shown and described without departing from the spirit of the invention or the scope of the following claims.

What is claimed is:

1. A webbing retractor retracting an occupant restraining webbing therein, adapted for use in a seatbelt system for a vehicle, which comprises:
   (a) a takeup shaft for winding the webbing thereon;
   (b) resilient means for biasing the takeup shaft in a direction of a webbing winding;
   (c) locking means capable of being put in a locked situation where the takeup shaft is prevented from rotation in a direction of a webbing unwinding when the occupant wears the webbing;
   (d) diameter sensing means for putting the locking means in a released situation where the takeup shaft can be rotated in the directions of the webbing winding and unwinding when the webbing is wound on the takeup shaft by a predetermined amount, said diameter sensing means comprising a sensing arm caused to abut on an outer peripheral face of a roll of the webbing which has been retracted on the takeup shaft to be moved in accordance with an increase and a decrease in a diameter of the roll of the webbing;
   (e) a spring member formed with a pair of legs which resiliently clips the takeup shaft and thereby rotates together with the takeup shaft by a frictional force between the takeup shaft and the spring member, the spring member being put in a first position where the locking means is kept in the released situation when it is rotated in the direction of the webbing unwinding and the spring member being put in a second position where the locking means can be put in the locked situation when it is rotated in the direction of the webbing winding, the locking means comprising a ratchet wheel fixed to the takeup shaft coaxially therewith and a pawl opposed to the ratchet wheel and fixed thereto with the sensing arm to be moved in accordance with the movement of the sensing arm, the pawl being caused to abut on the spring member when the spring member is put in the first position and it being separated from the spring member when the spring member is put in the second position, whereby when the webbing is wound on the takeup shaft by a predetermined amount after it is unwound for restraining the occupant, the pawl is engaged with the ratchet wheel so that the takeup shaft is prevented from rotation in the direction of the webbing unwinding; and
   (f) rotation restricting means for restricting a rotation of the spring member within a range between the first position and the second position, the rotation restricting means comprising a pin disposed between the legs of the spring member, whereby, when the takeup shaft is rotated, the spring is caused to abut on the pin so that the spring member is prevented from further rotation in a direction of the rotation of the takeup shaft and the spring member is biased in a direction of enlargement of a distance between the legs so that the frictional force occurring between the takeup shaft and the spring member when the takeup shaft is further rotated is reduced,
   whereby the occupant can be put in the securely restrained situation by the webbing when the webbing is wound on the takeup shaft after the occupant wears the webbing.

2. A webbing retractor as set forth in claim 1, wherein each of the legs of the spring member is formed with an outwardly curved portion abutting on the pin when the spring member is rotated, whereby the spring member is caused to abut on the pin fittingly.

3. A webbing retractor as set forth in claim 1, wherein the legs of the spring member are extended over their portions abutting on the takeup shaft.

4. A webbing retractor retracting an occupant restraining webbing therein, adapted for use in a seatbelt system for a vehicle, which comprises:
   (a) a frame fixed to a vehicle body and having a pair of leg plates parallel to each other;
   (b) a webbing takeup shaft rotatably supported by the leg plates of frame for retracting the webbing thereon;
   (c) a spiral spring retracting unit for biasing the takeup shaft in a direction of a webbing winding;
   (d) a ratchet wheel fixed to the takeup shaft coaxially with the takeup shaft;
   (e) a pawl rotatably supported by the leg plates of the frame to be opposed to the ratchet wheel, the takeup shaft being prevented from rotation in a direction of a webbing unwinding when the pawl is engaged with the ratchet wheel;
   (f) a spring biasing the pawl in such a direction to be engaged with the ratchet wheel;
   (g) a sensing arm fixed to the pawl, one end portion thereof being caused to abut on an outer peripheral face of a roll of the webbing which has been retracted on the takeup shaft to be moved in accordance with an increase and a decrease in a diameter of the roll of the webbing;
   (h) a spring member formed with a pair of legs forced to contact with the takeup shaft by a self spring force of the spring member, rotated together with the takeup shaft by a frictional force between the takeup shaft and the spring member, the spring member being put in a first position where the pawl is put in a released situation from the ratchet wheel when it is subjected to a rotation in the direction of the webbing unwinding and the spring member being put in a second position where the pawl is put in an engageable situation with the ratchet wheel when it is subjected to a rotation in the direction of the webbing winding;
   (i) rotation restricting means for restricting a rotation of the spring member within a range between the first position and the second position, the rotation restricting means comprising a pin provided on one of the leg plates between the legs of the spring member, whereby, when one of the legs of the spring member rotated in one direction together with the takeup shaft is caused to abut on the pin, the spring member is prevented from further rotation in the one direction and the spring member is biased in a direction of enlargement of a distance between the legs so that the frictional force occurring between the takeup shaft and the spring member when the takeup shaft is further rotated in the one direction is reduced; and (j) a cover fixed to the frame, for covering the spring member, whereby the occupant can be put in a securely restrained situation when the webbing is wound on the takeup shaft after the webbing is worn about the occupant.

5. A webbing retractor as set forth in claim 4, wherein each of the legs of the spring member is formed with an outwardly curved portion abutting on the pin when the spring member is rotated, whereby the spring member is caused to abut on the pin fittingly.

6. A webbing retractor retracting an occupant restraining webbing therein, adapted for use in a seatbelt system for a vehicle, which comprises:

(a) a frame fixed to a vehicle body and having a pair of leg plates parallel to each other;

(b) a webbing takeup shaft rotatably supported by the leg plates of frame for retracting the webbing thereon;

(c) a spiral spring retracting unit for biasing the takeup shaft in a direction of a webbing winding;

(d) a ratchet wheel fixed to the takeup shaft coaxially with the takeup shaft;

(e) a pawl rotatably supported by the leg plates of the frame to be opposed to the ratchet wheel, the takeup shaft being prevented from rotation in a direction of a webbing unwinding when the pawl is engaged with the ratchet wheel;

(f) a spring biasing the pawl in such a direction to be engaged with the ratchet wheel;

(g) a sensing arm fixed to the pawl, one end portion thereof being caused to abut on an outer peripheral face of a roll of the webbing which has been retracted on the takeup shaft to be moved in accordance with an increase and a decrease in a diameter of the roll of the webbing;

(h) a spring member formed with a pair of legs forced to contact with the takeup shaft by a self spring force of the spring member, rotated together with the takeup shaft by a frictional force between the takeup shaft and the spring member, the spring member being put in a first position where the pawl is put in a released situation from the ratchet wheel when it is subjected to a rotation in the direction of the webbing unwinding and the spring member being put in a second position where the pawl is put in an engageable situation with the ratchet wheel when it is subjected to a rotation in the direction of the webbing winding;

(i) rotation restricting means for restricting a rotation of the spring member within a range between the first position and the second position; and (j) a cover fixed to the frame, for covering the spring member, the rotation restricting means comprising a pin provided on the cover between the legs of the spring member, whereby, when one of the legs of the spring member rotated in one direction together with the takeup shaft is caused to abut on the pin, the spring member is prevented from further rotation in the direction and the spring member is biased in a direction of enlargement of a distance between the legs so that the frictional force occurring between the takeup shaft and the spring member when the takeup shaft is further rotated in the one direction is reduced, whereby the occupant can be put in a securely restrained situation when the webbing is wound on the takeup shaft after the webbing is worn about the occupant.

7. A webbing retractor as set forth in claim 6, wherein each of the legs of the spring member is formed with an outwardly curved portion abutting on the pin when the spring member is rotated, whereby the spring member is caused to abut on the pin fittingly.

8. A webbing retractor retracting an occupant restraining webbing therein, adapted for use in a seatbelt system for a vehicle, which comprises:

(a) a frame fixed to a vehicle body and having a pair of leg plates parallel to each other;

(b) a webbing takeup shaft rotatably supported by the leg plates of frame for retracting the webbing thereon;

(c) a spiral spring retracting unit for biasing the takeup shaft in a direction of a webbing winding;

(d) a ratchet wheel fixed to the takeup shaft coaxially with the takeup shaft;

(e) a pawl rotatably supported by the leg plates of the frame to be opposed to the ratchet wheel, the takeup shaft being prevented from rotation in a direction of a webbing unwinding when the pawl is engaged with the ratchet wheel;

(f) a spring biasing the pawl in such a direction to be engaged with the ratchet wheel;

(g) a sensing arm fixed to the pawl, one end position thereof being caused to abut on an outer peripheral face of a roll of the webbing which has been retracted on the takeup shaft to be moved in accordance with an increase and a decrease in a diameter of the roll of the webbing;

(h) a spring member formed with a pair of legs forced to contact with the takeup shaft by a self spring force of the spring member, rotated together with the takeup shaft by a frictional force between the takeup shaft and the spring member, the spring legs being extended over their portions abutting on the takeup shaft, the spring member being put in a first position where the pawl is put in a released situation from the ratchet wheel when it is subjected to a rotation in the direction of the webbing unwinding and the spring member being put in a second position where the pawl is put in an engageable situation with the ratchet wheel when it is subjected to a rotation in the direction of the webbing winding;

(i) rotation restricting means for restricting a rotation of the spring member within a range between the first position and the second position, the rotation restricting means comprising a pin provided on one of the leg plates between the extended portions of the legs, whereby, when the spring member rotated in one direction together with the takeup shaft is caused to abut on the pin, the spring member is prevented from further rotation in the one direction and the spring member is biased in a direction of an enlargement of a distance between the legs so that the frictional force occurring between the takeup shaft and the spring member when the takeup shaft is further rotated in the one direction is reduced; and (j) a cover fixed to the frame, for covering the spring member, whereby the occupant can be put in a securely restrained situation when the webbing is wound on the takeup shaft after the webbing is worn about the occupant.

9. A webbing retractor retracting an occupant restraining webbing therein, adapted for use in a seatbelt system for a vehicle, which comprises:

(a) a frame fixed to a vehicle body and having a pair of leg plates parallel to each other;

(b) a webbing takeup shaft rotatably supported by the leg plates of frame for retracting the webbing thereon;

(c) a spiral spring retracting unit for biasing the takeup shaft in a direction of a webbing winding;

(d) a ratchet wheel fixed to the takeup shaft coaxially with the takeup shaft;

(e) a pawl rotatably supported by the leg plates of the frame to be opposed to the ratchet wheel, the takeup shaft being prevented from rotation in a direction of a webbing unwinding when the pawl is engaged with the ratchet wheel;

(f) a spring biasing the pawl in such a direction to be engaged with the ratchet wheel;

(g) a sensing arm fixed to the pawl, one end portion thereof being caused to abut on an outer peripheral face of a roll of the webbing which has been retracted on the takeup shaft to be moved in accordance with an increase and a decrease in a diameter of the roll of the webbing;

(h) a spring member formed with a pair of legs forced to contact with the takeup shaft by a self spring force of the spring member, rotated together with the takeup shaft by a frictional force between the takeup shaft and the spring member, the spring legs being extended over their portions abutting on the takeup shaft, the spring member being put in a first position where the pawl is put in a released situation from the ratchet wheel when it is subjected to a rotation in the direction of the webbing unwinding and the spring member being put in a second position where the pawl is put in an engageable situation with the ratchet wheel when it is subjected to a rotation in the direction of the webbing winding;

(i) rotation restricting means for restricting a rotation of the spring member within a range between the first position and the second position; and (j) a cover fixed to the frame, for covering the spring member, the rotation restricting means comprising a pin provided on the cover between the extended portions of the legs, whereby, when the spring member rotated in one direction together with the takeup shaft is caused to abut on the pin, the spring member is prevented from further rotation in the one direction and the spring member is biased in a direction of an enlargement of a distance between the legs so that the frictional force occurring between the takeup shaft and the spring member when the takeup shaft is further rotated in the one direction is reduced, whereby the occupant can be put in a securely restrained situation when the webbing is wound on the takeup shaft after the webbing is worn about the occupant.

* * * * *